Reissued Apr. 26, 1938

Re. 20,708

UNITED STATES PATENT OFFICE 20,708

ACCELERATED DIAZO PRINTING AND MATERIALS THEREFOR

Walker M. Hinman, Winnetka, Ill., assignor to The Frederick Post Company, Chicago, Ill., a corporation of Illinois No Drawing. Original No. 2,027,229, dated January 7, 1936, Serial No. 549,561, July 8, 1931. Application for reissue February 19, 1938, Serial No. 191,519

22 Claims. (Cl. 95—6)

The present invention relates to light-sensitive materials, to products incorporating light-sensitive materials, and to methods of using such materials and products. It has special reference to photographic work, especially in the field of technical copying which is exemplified by the so-called blue print, brown print, and diazo type processes and papers.

The invention may be used in other fields as will appear hereinafter, but at present it has its chief utility in this field as a substitute process and product for the present day usages of technical copy papers such as sensitized diazo papers and the well known blue print papers.

The blue print papers offer a limited utility, being confined to blue and white contrasts. They print negative, that is, a tracing having an opaque dark line on a white translucent or transparent background, produces a white line on a blue background. Other disadvantages of the blue print papers are well known.

The diazo papers offer a wider variety of color and they print positive. In them a compound is used which is sensitive to light so that light decomposes it. When and where the sensitive compound is not decomposed, the treatment following light exposure causes the sensitive compound to be developed into a dyestuff. Accordingly the dyestuff is formed where the paper is screened from light and a direct print results. The nature of the light-sensitive compound will be explained more in detail hereinafter, so it will suffice for the present to term it by its true technical name "a diazonium" compound, also called a "diazo" compound. Certain of the dyestuffs, called azo dyes, are made from a diazonium compound by a coupling reaction with a color-forming component. Diazonium compounds are characterized by instability, which property varies from explosive instability to high stability. The degree of stability is dependent upon the nature of the nucleus of the compound as well as upon the conditions to which it is exposed. Heat, light, acidity, alkalinity, pressure, and associated substances also determine stability. Diazo papers utilize these diazonium compounds having instability to light. Numerous dye-forming bases and components have been proposed in various combinations for making the diazo papers. Many diazonium compounds may be made but cannot be used in practical diazo papers, because they cannot be placed in situ on paper and be there dried and retained as sufficiently stable compounds until they are used in commercial reproduction by light-printing.

The art has been able to select only a few specific substances which are practical and successful for commercial use. There are conflicting properties to be considered. On one hand the diazonium compound must be sufficiently unstable to light so that a print can be made at commercial speeds which are well established in the art. On the other hand it must be sufficiently stable so that it can be prepared, applied to paper, dried thereon, stored, shipped, again stored, opened, handled in preparation for exposure, and then exposed to give clear and sharp prints. These are the rigid requirements of commerce, and many incidental factors must be considered, such as light, heat, cold, moisture, etc. There must also be considered the permanence of the color formed. As a consequence the art has had difficulty in meeting all the practical requirements. Too stable compounds could not be used, and too unstable compounds could not be used.

Search of the practical art will show that many proposed compounds are not satisfactory and have met with no success in commerce. There are compounds which are suitable for producing results on exercise of unusual precautions, but they will not meet the commercial requirements. Many patents will be found which are directed to specific bases or classes of bases, but commercial success with them is not assured.

By use of the present invention the diazonium compounds may be selected particularly for their high stability without that other consideration of a special degree of instability which renders them useful for commercial speeds of light-printing and as marketable products.

One object of the invention is the provision of an accelerator for decomposition of diazonium compounds.

Another object of the invention is the formation of an accelerator in situ by the action of the light which is to effect the decomposition of the diazonium compound.

Other objects of the invention relate to development of the dyestuff from the undecomposed diazonium compound, and the development of the dyestuff with special regard for avoiding certain possible defects which may arise from material associated with the accelerator.

In general the objects are to develop the dyestuff in a manner which is compatible with all the conditions which prevail, as will be more clearly explained hereinafter.

Various other and ancillary objects and advantages of the invention will be apparent from the following description of the invention and from the several accompanying examples.

It is known that diazonium compounds are particularly sensitive to certain other substances which act as accelerators or catalyzers of decomposition. In Perkin and Kipping, "Organic Chemistry" Ed. of 1911, page 414, it is stated: "The diazonium salts behave in a very remarkable way when they are treated with cuprous salts; when, for example, a solution of phenyldiazonium chloride is warmed with a solution of cuprous chloride in hydrochloric acid, nitrogen is evolved, but instead of phenol, chlorobenzene is produced. In this reaction the diazonium salt combines with the cuprous chloride to form a brownish additive compound, which is decomposed at higher temperatures.

$$C_6H_5.N_2Cl,2CuCl \rightarrow C_6H_5Cl + N_2 + 2CuCl \text{ — — —"}$$

The article continues showing that cuprous bromide and potassium cuprous cyanide react similarly. It is also shown on page 416 that copper powder effects the decomposition of diazonium salts.

Copper and its cuprous compounds are therefore old and well known examples of accelerators used in solutions of diazonium compounds. The present invention aims to use accelerators in dried sensitized papers to speed up decomposition of the more desirable otherwise highly stable diazonium compounds. The accelerator may be incorporated with the diazonium compound in active form so long as it is inactive until influenced by light. However, I prefer to employ a substance which is known to change by light into an active form. In consequence I have employed originally such materials as are affected by light, such as ammonium ferric oxalate (known also as ammonium ferrioxalate) of the blue print art, so that they are activated to produce an accelerator which speeds up the decomposition of the diazonium compound. I do not state that all substances which are light-sensitive will produce accelerators for this invention, and I have found that some will function readily with certain diazonium compounds and appear not to function, or to be of little advantage when used with other diazonium compounds. For example, chromium compounds and copper compounds of certain type sometimes act equally on certain diazonium compounds, and on other ones they show little beneficial effect, or one is beneficial and the other appears to have little accelerating effect, or may even be injurious. Among other light-sensitive materials I name the silver halides, well known in photography, and certain cobalt salts referred to in U. S. Patent No. 1,594,470.

Present day blue print practice has set the standard for degree of light exposure acceptable to the art. The present invention in its preferred form makes use of two classes of sensitive substances, one of which is adopted from the blue print art, and which is sufficiently speedy in response to light. The other is adopted from the diazo art and is the preferred species within which may be classed those defined as too stable for practical use in the diazo art. The first reaction forms a product which is an accelerator to speed up the second reaction to a commercial speed.

In order to be specific for the purpose of illustration, a generalized example will be stated.

*Example I*

Cresidine is diazotized to form a diazonium compound which may be dried in a suitable coating on paper in a manner well known in the art. The diazonium compound is relatively stable against light and hence is not commercially desirable in the heretofore known uses, as its printing speed is too slow. I combine with this compound a light-sensitive material having a reducible oxide of metal, such as a ferric oxalate, of which the ferric iron is reduced by the oxalate under the influence of light to form an accelerator. It is well known that this salt is decomposed by light in such a way that the ferric oxide oxidizes the oxalic acid with which it is combined and forms a ferrous compound. I have discovered that the ferrous compound accelerates the decomposition of the diazonium compound. It is analogous to the action of the cuprous salts above referred to, but it is entirely unexpected that the accelerating effect should occur in a dried mixture.

Both the diazonium compound and the ferric oxalate alone, and combined, and in the dark, are highly stable and easily meet the practical requirements of the art to place them on the paper and to get them into the hands of the user with no more precautions than are required for ordinary blue print papers.

The light-struck portions of sensitized paper should lack a diazonium compound which can be coupled with a dye-forming component. I may have such a component present in the paper so that the paper may be subjected to conditions favoring the coupling, or I may apply the component to the light-printed sheet and thus develop the color. This latter method is preferred, because the component may be varied according to the color desired.

Thus, I may wet the dry exposed sheet, as with a sponge which is wet with a solution containing a coupling component, such as beta naphthol in sodium hydroxide, or resorcinol in sodium hydroxide. Other coupling agents may be used such as phloroglucin, H-acid, gamma-acid, J-acid, 2-hydroxy 3-naphthoic acid, R-acid, or Nevile and Winther's acid.

The color usually develops immediately. Excess salts and chemical may be washed out. Because it is desirable to wash, a component is used which forms a fast dye which resists the washing, and one which is a direct dye for cellulose, where paper is used as the base. The iron or other metal from the accelerator may incidentally act as a mordant for the dye.

Because metal salts, such as iron salts from the accelerator may be present, care must be taken to prevent coloration of a desired white field. Ferrous iron compounds in particular may slowly oxidize and cause a brownish color in the field, which would otherwise be white. Therefore, where such tendency exists, I use a cleaning agent which insures removal of such iron compounds or any other coloring agent. This is preferably, although not necessarily, incorporated in the solution containing the coupling component. Both substances together may be provided as a developer, insuring sharp contrast in field and lines with permanence of such contrast.

From the foregoing example the nature of the invention may be understood. From the following discussion and examples the scope of the invention may be comprehended.

*The diazonium compound*

I have found that those amino compounds are suitable which can be diazotized to form very stable diazonium compounds. Of course, I prefer the more highly stable ones to take full advantage of the invention. I have found that various aniline derivatives may be used, especially ortho anisidine and para phenetidine. Benzidine may be used, but it is less suitable and not satisfactory for the more severe commercial demands. Tolidine is better than benzidine, and dianisidine is still better. The amino derivatives of napthalene, anthracene, carbazol, diphenyl amine, and others may be used. The stability follows the general rule of the dyestuff art, that stability increases with the complexity of the molecule, and that the substituent groups have certain characteristic influences dependent upon their character, their positions in the nucleus, and their relations to other substituents. In general I have found that the methoxy and homologous groups produce stability, especially when one is adjacent the amino group. The following amines are listed as suitable; and selection from them may be made for stability without the consideration of suitable light sensitivity when used alone:

Para amino acetanilide, para amino acetophenone, 1-amino anthraquinone, para amino dimethyl aniline, para amino diphenyl, para amino diphenyl amine, amino G-acid, ortho anisidine, benzidine, para chloro ortho anisidine, cresidine, dianisidine, dichloro aniline, beta naphthylamine, tolidine, para toluidine, para phenetidine, xylidine.

*The accelerator*

The accelerator per se is preferably not to be present with the diazonium compound or to be active, except by action of light as in printing. It is to be formed or activated by the light. The form of ferric oxalate used in blue print papers is suitable. Uranium, chromium, copper, cobalt, nickel and manganese are other metals like iron which have higher and lower oxides. These may be used, but all salts of these metals are not usable, nor are these metals universally useful with all diazonium compounds, as explained above, and as will appear below. Certain salts of the higher oxides are light-sensitive and form the lower oxides. Citrates, tartrates or oxalates may be used. It is not necessary for the iron or other metal to be added as a specific salt such as the metal tartrate, citrate or oxalate. It is sufficient that the metal ions be present and that the acid ions or other material be present so that it may be oxidized as the reduction occurs. An oxalate is the preferred salt used for consuming the oxygen in effecting reduction. The lower oxide forms, as in salts, appear to be active. A metal itself obtained by light-reduction from a salt, such as a silver halide may also be effective.

As a result of many experiments with many materials I find that an iron compound is most universally effective. It is my opinion, not fully confirmed, that of those metals having higher and lower oxide forms, the activity as accelerators is greatest with those metals which normally exist or tend to exist in the higher oxide form. This is a very characteristic property of iron which has the ferric and ferrous forms; of chromium, which has the chromic and chromous forms; and of copper, which has the cupric and cuprous forms. These metal forms have their special tendencies to be converted from one form to another, and the facility of such conversion is dependent upon many factors, including acidity, alkalinity, and associated materials. Conditions prevailing in papers treated with various diazonium compounds therefore may be very effective in preventing one metal from functioning properly in one case, whereas it may function excellently in another case.

It is also pointed out that it is not necessary to employ the accelerating agent in the form of a simple metal salt, like ferric chloride, cupric chloride. The metal may be present in a complex acid radicle, as I have successfully used potassium dichromate. It is well known that chromium has three valences, and three oxide forms, chromic anhydride $CrO_3$, chromic oxide $Cr_2O_3$, and chromous hydroxide $Cr(OH)_2$. I have found that the best results are obtained with chromium compounds by employing chromates, and offer no theory to explain the specific mechanism of its action.

*Dye-forming component*

The dyestuff art teaches what bases and what components combine to form certain colors. By the proper choice of components and bases, practically any color may be formed, and the manner of its formation is easily ascertained. Where the component is applied after the printing, the field of choice is wider than where the component is present in the paper with the diazonium compound. In case the component is included in the paper prior to printing, as is done in some papers, it must be compatible with the presence of the accelerator, with the material which forms the accelerator, with the products formed from the accelerator, and with practical requirements. Specific coupling components are not herein enumerated but some may be found in the appended examples, since these are too well known in the dyestuff art.

*Cleaning agent*

I include in the above term the material which is effective to prevent a discoloration of the field. It may be an acid, an alkali or a salt, which functions in the coupling reaction, or it may be a specially employed ingredient. In the case of ferric oxalate as the source of the accelerating substance, I use a solution of an oxalate salt such as potassium oxalate which is strong enough to dissolve the residual iron forming a complex potassium iron oxalate, and thus preventing formation of a ferric oxide or hydroxide in the white field of the paper. In the preferred practice I incorporate the potassium or other oxalate in a "developer" solution along with the coupling component.

*Developer*

From the two foregoing paragraphs it is seen that two processes may be required after printing, one, to develop the color, and two, to purge the paper of possible discoloring material, especially from the accelerator. These may be combined into one step using a solution having ingredients suitable to perform the two functions. Thus, one application of one liquid to the printed paper may be all that is required to develop a suitable permanent and attractive contrast, after which the customary washing is made.

*The carrier*

By the term carrier I refer to the material which carries the coating. In the art as it is developed today a paper of felted fibers is commonly employed. But I have used glass, and other rigid substances, either transparent, translucent or opaque. Cloth or films of cellulose nitrate, cellulose acetate, regenerated cellulose, gelatine and the like may be employed. There is no essential co-action between the carrier and the film, and of course a carrier is chosen in which ingredients of the carrier do not adversely affect the sensitive composition while in storage or at any other time prior to actual exposure to light for printing.

*Materials for the examples*

In the following examples, unless otherwise specified it is to be understood that the carrier is a 50% rag stock paper. The exposures of the sensitized papers of the examples have been made under uniform, comparable conditions which are at the present day accepted as standard or commercial. These involve an arc lamp as a source of light and rotary printing machines. A common commercial exposure is about 3 minutes, but in the examples variations will be noted.

The diazotization may be carried out in numerous ways as is well known in the art, and variations frequently depend upon the characteristics of the amino compound employed. Unless otherwise specified the diazotizations in the accompanying examples have been carried out using the weight of amino compound specified, 40 cc. of 37% hydrochloric acid, 14.5 gms. of sodium nitrite (96%) and the necessary water. It is to be understood that the usual procedure is to dissolve the nitrite and slowly add it to a solution containing the acid and the amino base, either solid, or dissolved, usually in the cold to preserve in solution the nitrous acid formed, and to prevent decomposition. A large or small volume of liquid may be employed and the character of the dye and desired intensity of the print in part determine the volume. Unless otherwise specified the volume of water in the diazotization may be taken as about 1 liter or 1 quart for the amounts above given.

The following examples have been developed with a "developer" which, unless otherwise specified, is compounded as follows:

| | Grams |
|---|---|
| Coupling component | 10 |
| Anhydrous potassium carbonate | 14 |
| Potassium oxalate ($K_2C_2O_4.H_2O$) | 90 |
| Water about | 1000 |

In the above formula the oxalate is present to function in removing iron residues where iron is used as the accelerator. It is not necessary for the removal of compounds of copper, chromium and other residues, as they are less colored than iron. Where it is desirable to remove residues, like copper or chromium compounds, ammonia or tri-ethanol amine may be employed. These form soluble complexes with the residues and effect removal from the print.

*Example II.—Para amino acetanilide*

Thirty grams of para amino acetanilide may be diazotized as above indicated using, however, about 5 liters of water. A brownish diazo solution results which is fairly stable to storage. A paper coated with the solution, and dried requires an exposure of about 14 minutes to give good prints, and the so printed paper may be developed with beta naphthol, R-acid (beta naphthol 3-6 disulphonic acid), J-acid (2-5 amidonaphthol-7-mono-sulphonic acid), gamma acid (beta naphthol 6-8 disulphonic acid), resorcin, phloroglucin, Nevile and Winther's acid (alpha naphthol-4-mono-sulphonic acid), H-acid (1-8-amidonaphthol-3-6-disulphonic acid), and others. The paper is stable and useful, but too slow.

To accelerate the printing speed, I add to 150 cc. of the diazo solution as above prepared:

| | Gram |
|---|---|
| Ferric chloride ($FeCl_3.6H_2O$) | 1 |
| Oxalic acid ($H_2C_2O_4.2H_2O$) | 1 |
| Potassium oxalate ($K_2C_2O_4.H_2O$) | 1 |

The modified solution may be coated onto paper and dried in the usual way. It may be printed in 2.5 minutes to produce a satisfactory contrasting print when developed with phloroglucin. Exposures of 5 minutes and 7.5 minutes improve the contrast, but the increasing improvement is less than that to be expected from the increased time. Paper similarly prepared, exposed and developed with no addition of ferric chloride, as a standard for comparison, gives a much inferior and an incomplete print at 7.5 minutes' exposure than the accelerated paper in 2.5 minutes.

In place of using ferric chloride, the same amount of potassium dichromate ($K_2Cr_2O_7$) may be employed, but not with the same results. There is acceleration, but it is less, and a 2.5 minute exposure is about comparable to a 7.5 minute exposure of the blank. Additional exposure beyond 2½ minutes gives little improvement.

In the case of iron and chromium the most effective period of acceleration is in the first 2.5 minutes of exposure.

Cupric chloride substituted for the iron or the chromium accelerator shows little acceleration.

The same accelerators have been found to have the same relative advantages where ortho tolidine or para phenetidine are employed as the amino compound.

*Example III.—Para amino acetophenone*

Twenty-seven grams of para amino acetophenone may be diazotized, using about 1 liter of water. The diazo solution is not very stable. Paper prepared from the solution may be printed in 16 minutes' exposure, and developed with numerous coupling components including H-acid. Accelerated papers may be prepared as in Example II, using the materials and proportions therein named. The control in 6 minutes of exposure, developed with H-acid, shows no decomposition of the diazonium compound. The iron accelerated paper shows sharp contrast in the same treatment; the chromium accelerated paper shows acceleration but only partial contrast in that time; and the copper accelerated paper in the same period shows but slight evidence of acceleration.

The control sheet on development shows some bleeding of the dye, and the bleeding is not evidenced where the metal compounds have been added. This illustrates the mordanting effect of accelerating agents.

The same order of advantage has been found where other amino compounds are employed, as in Example IX below, and also where I have used benzidine as the amino compound. In the latter case an 18 minute exposure for an unaccelerated diazo coating may be reduced to 2.5 minutes.

*Example IV.—1-amino anthraquinone*

Forty-five grams of 1-amino-anthraquinone is diazotized using about 1 liter of water. The amine which I employed was difficult to dissolve in hydrochloric acid, even on boiling. The diazo solution contained a sediment from which a clear yellow solution was filtered. This may be coated on paper and even dried with heat, remaining sensitive to light, making good prints in three minutes, developed with numerous coupling agents, including H-acid.

Iron, copper and chromium accelerated papers were made as in Example II, with a control or blank. The blank gave a good print in 3 minutes, and the iron and copper gave as good a print in one minute, developed with H-acid. The iron and copper appear substantially equal in power in this instance, while the chromium paper showed no acceleration, and evidenced a disadvantage, apparently bleaching the compound, both where it is exposed and unexposed.

This illustrates the specificity of the combinations.

*Example V.—Para-amino dimethyl aniline*

Twenty-seven and a half grams of para amino dimethyl aniline are diazotized, using 70 cc. of the 37% hydrochloric acid, 16 grams of sodium nitrite and about 2 liters of water. A dark brown diazo solution is obtained with some sediment from which a fairly stable clear coating liquor may be filtered. A six minute exposure and development with phloroglucin makes an excellent black print.

Control and accelerated papers were made as in Example II with copper, iron and chromium. In a three minute exposure, the control, the iron and the chromium papers appear nearly alike, and the copper paper appears slightly accelerated. In a 6 minute exposure all appear similar. This further illustrates the specificity of combinations.

*Example VI.—Para amino diphenyl*

Thirty-four grams of para amino diphenyl printed and developed with Nevile and Winther's acid makes good prints in 16 minutes exposure. An iron accelerated paper makes a better print in three minutes than a control. Copper works slightly better than chromium, but both are less efficient than the iron.

In Examples II, III, and V chromium is better than copper, but in this example copper is better than chromium. I have also found that where I use beta naphthylamine, copper is better than chromium, and that in the case of chromium there is an undesirable bleaching, as in Example IV.

*Example VII—Amino G-acid*

Thirty-two grams of amino G-acid diazotized with 7 grams sodium nitrite, 80 cc. of 37% hydrochloric acid, and about 1 liter of water, makes a very stable diazo solution, even to boiling. Sixteen minutes exposure makes good prints. An iron accelerated paper in 3 minutes exposure, developed with Nevile and Winther's acid shows marked acceleration.

Iron also functions successfully with other materials, such as xylidine, para toluidine, and dichloro aniline.

*Example VIII.—Dichloro aniline*

Thirty-three grams of dichloro aniline, dissolved with 200 cc. of 37% hydrochloric acid, diazotized with 16 grams of sodium nitrite and about 800 cc. of water, makes a paper which may be exposed for 16 minutes and developed with resorcin to form a good print. An iron accelerated paper prepared as in Example II makes a similar print in 3 minutes, during which time the control shows no contrast.

*Example IX.—Ortho amino anisole*

Twenty-four and a half grams of ortho amino anisole is diazotized. The diazo solution is light yellow and does not noticeably decompose on storage, or upon coating paper and drying. After 16 minutes exposure and development with beta naphthol, it gives a bright red print.

Control paper, and accelerated papers were made as above indicated for copper and chromium and for iron was modified by substituting the same amount of ammonium ferric oxalate $(NH_4)_3Fe(C_2O_4)_3.4H_2O$.

The control blank shows no effective printing at 6 minutes and slight printing at 9 minutes.

The copper paper in 3 minutes shows printing whereas the control at 3 minutes shows no printing. The chromium paper shows more printing than the copper in 3 minutes. The iron paper in 3 minutes makes a useful print. Bleeding is noticeable in the control, but in the accelerated papers it is absent.

*Example X.—Dianisidine*

Thirteen and eight-tenths grams of dianisidine, 22.5 cc. of 37% hydrochloric acid, 8 grams of sodium nitrite, and about 10 liters of water are used to diazotize in the usual manner. The diazo solution is very stable to storage and to boiling, and stability may be further improved by adding more acid.

A 10 minute exposure and development with H-acid forms a blue print. A control paper in two minutes exposure shows little printing, but an iron paper is completely printed in two minutes.

Copper and chromium papers are slower and apparently of equal speed. In four minutes they are satisfactorily printed, but in 6 minutes they are properly printed and much superior to the control in 6 minutes.

*Example XI.—Para amino diphenylamine*

For the purpose of illustrating another point the case of para amino diphenylamine is mentioned, not as an example of the invention, but in explanation of an important point in connection with it. This material forms a very stable diazo solution which can be developed to a black print by phloroglucin and to an attractive blue by H-acid. It is very light sensitive and appears to be at least as sensitive or is more sensitive than the iron accelerator, when a paper is made and iron is incorporated as previously described. This example illustrates the fact that not every diazo solution, even though one be stable, is capable of being accelerated by iron with oxalate. I do not state that it is incapable of acceleration, for other material or other combinations which create the accelerator more speedily might also accelerate this particular diazo compound. It is also possible that an accelerator for the accelerator, for example, one for ferric oxalate, may be found, which would cause the iron paper to be effective.

*Example XII.—Para phenetidine*

Twenty-seven and a half grams of para phenetidine are diazotized with about 2 liters of water;

60 grams of R-acid, as a coupling agent are present in the diazo solution, but it does not couple in the acid solution and it can be made to couple by adding alkali to the solution, or to the paper coated therewith, either before or after exposure. Diazo papers of this type are used extensively in the commercial art, wherein it is a practice to subject the exposed paper to moist ammonia gas. These are called ammonia development papers, further described in U. S. Patent No. 1,444,469 to Koegel et al.

Para phenetidine in diazo solution, without coupling agent requires about a 16 minute exposure, and is an example of dye-forming amines which are too slow for commercial use in the ammonia development process. By adding an accelerator according to this invention, such amines may be made useful for commercial speeds of printing.

A control and an accelerated paper may be made from the potentially reactive dye-forming diazo solution above described by adding the ingredients in the proportions hereinabove given as generally applicable to these examples.

A control paper exposed for 3, 6 or 9 minutes showed no signs of diazo decomposition.

An iron accelerated paper showed decomposition of the diazo compound in 3 minutes' exposure. A copper accelerated paper showed no more decomposition than the blank. A chromium accelerated paper showed slight decomposition in 3 minutes, but even in 9 minutes it was less accelerated than the iron paper in 3 minutes. Acceleration in the above, as in all cases, has been determined by the character of the prints. In this case ammonia fumes from 26° Bé. ammonia water have been used for development, rather than a developer solution, as used in other examples.

*Example XIII.—Other combustion agents*

In the foregoing oxalic acid added as such or as an oxalate is the combustion agent, which is oxidized during the reduction by light of the higher oxide to a lower oxide. Citric acid and tartaric acid are also effective with iron, chromium and copper.

2-amino anisol may be diazotized to formed a 1/10 molar diazo solution in the usual way. Control and accelerated papers have been made as above described, using in the amount specified either oxalic acid, citric acid, tartaric acid, or no such acid, each case in combination with the amount specified of ferric chloride, cupric chloride, potassium dichromate, or no accelerator. In the four combinations with no organic acid (combustion agent) very poor and indistinct prints result in a fixed time of exposure and development with Nevile and Winther's acid. In the combinations using no metals the results were also indistinct and poor. In the combinations of iron and the three acids, the prints were clear and distinct. In the four cases of copper, all prints were faded and "washed out" in appearance, but those three having the acids show more clarity than the one with no acid. In the four cases of chromium, the results were better than with no metal, better than with copper, but not so good as with iron.

This experiment further illustrates the superiority of iron, the equivalency of citric acid, tartaric acid, and oxalic acid, and the specificity of combinations.

In the foregoing experiments of this example the developer unless otherwise specified contained 10 grams of Nevile and Winther's acid and 10 grams anhydrous potassium carbonate per liter. For the iron papers, the developer had in addition 90 grams of potassium oxalate ($K_2C_2O_4.H_2O$) per liter. For the chromium and copper papers the potassium carbonate as the alkaline agent, and the potassium oxalate as the cleaning agent, have been replaced by the alkaline cleaning agent triethanol amine to the extent of 10 grams per liter.

*The control and accelerated papers*

In ordinary diazotizing processes the residual acidity, usually of hydrochloric acid, in the diazotized solution used for coating, leaves the dried coating acid in character. In making control and accelerated papers as above described, the addition of oxalates, citrates, tartrates and the like replaces the stronger hydrochloric acid with a weaker organic acid, such as oxalic, citric or tartaric. These are less destructive and corrosive, and form a better paper for commercial use.

Although the present invention has been generally described and illustrated by reference to the printing of papers, like blue prints, usually for records and drawings, it is not limited to such a field. It may be applied to printing cloth for dress goods, household purposes and the like, for making wall papers and in any other field where dye-stuffs in design form may be desired.

Exposure for partial and complete decomposition of diazo coatings may be effected, and by development, no color, high color, and a variety of tones of color may be effected at one time. Various developers can be printed onto an exposed coated or impregnated surface to give different colors in the design.

The field becomes more practical and open to such a process because more stable dyes may be used. The fact that the accelerator may mordant the dyestuff also aids in producing more stable and fast colors by the light process, than has been possible heretofore in the art.

The use of the present invention in printing cloths and papers with art designs permits elimination of plates, and rolls, cut or engraved. The usual copper rolls used in printing textiles are expensive and require a large production to meet the cost. Because light stencils, comparable to tracings of drawings, may be used, a small production of special designs may be effected at low cost by use of this invention.

The invention is not limited to making diazo solutions in the order of addition found in the above description. I have changed the method of diazotization in numerous ways, and have added the accelerating agent, such as the iron compound before diazotization without loss of the accelerating effect.

In general, it appears that there is an unordered specificity of materials and combinations which might be thoroughly explained as an ordered one if sufficient combinations were studied. Iron with oxalate, appears to be most universally specific, and most advantageous. Copper and chromium sometimes appear fully equivalent to iron, or to each other, or one or both sometimes appear ineffective. It is to be understood that no general limitations should be placed upon any material, and that the invention should not be limited by nor to the disclosures herein made.

The disclosure clearly teaches one skilled in the art that he may modify the combinations herein disclosed and use other materials having the characteristics herein described, and in the combinations herein described, without departing from the spirit and scope of the invention as expressed in the appended claims.

I claim:

1. A photographic article comprising a carrier having a thin layer of material containing a light-sensitive diazonium compound and the essential component parts of a light-sensitive salt, one component part being a higher oxide form of a metal having two oxide forms, and another part being organic in character and being a reducing agent under the influence of light for reducing the higher oxide form to a lower oxide form, the lower oxide form serving after its formation by light to aid in the decomposition of the diazonium compound.

2. A photographic article comprising a carrier having a thin layer of material containing a light-sensitive diazonium compound, a compound having metal in higher oxide form selected from the group consisting of iron, chromium and copper, and a combustion agent for said form of selected metal, the metal compound and the combustion agent being reactive together under the influence of light to create an accelerating agent for the decomposition of the diazonium compound.

3. A photographic article comprising a carrier having a thin layer of material containing a light-sensitive diazonium compound, a compound having metal in higher oxide form selected from the group consisting of iron, chromium and copper, and an organic combustion agent for said form of selected metal, the metal compound and the combustion agent being reactive together under the influence of light to create an accelerating agent for the decomposition of the diazonium compound.

4. A photographic article comprising a carrier having a thin layer of material containing a light-sensitive diazonium compound, a compound of metal in a higher oxide form selected from the group consisting of iron, chromium and copper, and a combustion agent for said form of selected metal, said agent being selected from the group of tartaric acid, citric acid, and oxalic acid, the metal compound and the combustion agent being reactive together under the influence of light to create an accelerating agent for the decomposition of the diazonium compound.

5. A photographic article comprising a carrier having a thin layer of material containing a light-sensitive diazonium compound, a ferric compound, and a combustion agent for said ferric form of iron, said ferric compound and the combustion agent being reactive together under the influence of light to create an accelerating agent for the decomposition of the diazonium compound.

6. A photographic article comprising a carrier having a thin layer of material containing a light-sensitive diazonium compound, a ferric compound, and a combustion material containing an acid radical from the group consisting of the acids, citric, tartaric and oxalic, said ferric compound and the combustion material being reactive together under the influence of light to create an accelerating agent for the decomposition of the diazonium compound.

7. A photographic article comprising a carrier having a thin layer of material containing a light-sensitive diazonium compound, a ferric compound, and a combustion material containing an oxalate radicle, said ferric compound and the combustion material being reactive together under the influence of light to create an accelerating agent for the decomposition of the diazonium compound.

8. A photographic article comprising a carrier having a thin layer of material containing a light-sensitive diazonium compound, a cupric compound, and a combustion agent for said cupric form of copper, said cupric compound and the combustion agent being reactive together under the influence of light to create an accelerating agent for the decomposition of the diazonium compound.

9. A photographic article comprising a carrier having a thin layer of material containing a light-sensitive diazonium compound, a compound containing a higher oxide form of chromium, and a combustion agent therefor, said chromium compound and the combustion agent being reactive together under the influence of light to create an accelerating agent for the decomposition of the diazonium compound.

10. A light-sensitive material containing a normally slowly decomposable light-sensitive dye-forming diazonium compound and a light-sensitive oxalate salt of a higher oxide of a metal having a lower oxide form, which salt is reducible by light to a compound of a lower oxide of said metal, whereby in the reduction to produce an agent effective in the decomposition of the diazonium compound.

11. A light-sensitive material containing a normally slowly decomposable light-sensitive dye-forming diazonium compound and a light-sensitive ferric oxalate salt, whereby on exposure to light the decomposition of ferric oxalate hastens the decomposition of the diazonium compound.

12. A light sensitive material containing a decomposable diazonium compound incapable when decomposed of combining with a coupling agent to form a dyestuff, and accelerating material for said decomposition intimately associated with said diazonium compound, said accelerating material having a reducible substance in the form of a compound of a metal in higher oxide form selected from the group consisting of iron, copper and chromium, and a combustion substance derived from the group consisting of oxalic acid, citric acid and tartaric acid, the combination of diazonium compound, reducible substance, and combustion substance being such that under the influence of light the decomposition of the diazonium compound is hastened by the presence of a compound having a lower oxide form of the metal, and such that under the influence of light the combustion substance reduces the higher oxide form of said metal to the effective lower oxide form.

13. A light sensitive material containing a decomposable diazonium compound incapable when decomposed of combining with a coupling agent to form a dyestuff, and accelerating material for said decomposition intimately associated with said diazonium compound, said accelerating material having a reducible substance in the form of a compound of a metal in higher oxide form selected from the group consisting or iron, copper and chromium, and a combustion agent for said higher oxide form of metal, the combination of diazonium compound, reducible substance and combustion agent being such that under the influence of light the decomposition is hastened by the presence of a compound having a lower oxide form of the metal, and such that under the influence of light the combustion agent reduces the higher oxide form of said metal to the effective lower oxide form.

14. A light sensitive material containing a decomposable diazonium compound incapable when decomposed of combining with a coupling agent to form a dyestuff, and accelerating material for said decomposition intimately associated with said diazonium compound, said accelerating material having a reducible substance in the form of compound of a metal in higher oxide form reducible to lower oxide form, and a combustion substance derived from the group consisting of oxalic acid, citric acid, and tartaric acid, the combination of diazonium compound, reducible substance, and combustion substance being such that under the influence of light the decomposition of the diazonium compound is hastened by the presence of a compound having a lower oxide form of the metal, and such that under the influence of light the combustion substance reduces the higher oxide form of said metal to the effective lower oxide form.

15. A light sensitive material containing a decomposable diazonium compound incapable when decomposed of combining with a coupling agent to form a dyestuff, and accelerating material for said decomposition intimately associated with said diazonium compound, said accelerating material having a reducible substance and a combustion agent combined together in the form of a light sensitive ferrioxalate salt reducible by light to form a compound of ferrous oxide, the combination of diazonium compound and ferrioxalate salt being such that under the influence of light the diazonium compound decomposes faster by virtue of the presence of the ferrous oxide compound formed by the effect of light.

16. A light sensitive material containing a decomposable diazonium compound incapable when decomposed of combining with a coupling agent to form a dyestuff, and accelerating material for said decomposition intimately associated with said diazonium compound, said accelerating material having a reducible substance in the form of a compound of a ferric form of iron, and a combustion agent therefor, the combination of diazonium compound, reducible substance, and combustion substance being such that under the influence of light the decomposition of the diazonium compound is hastened by the presence of a compound having a lower oxide form of the metal, and such that under the influence of light the combustion substance reduces the higher oxide form of said metal to the effective lower oxide form.

17. A light sensitive material containing a decomposable diazonium compound incapable when decomposed of combining with a coupling agent to form a dyestuff, and accelerating material for said decomposition intimately associated with said diazonium compound, said accelerating material having a reducible substance in the form of a compound of a ferric form of iron, and a combustion agent therefor derived from the group consisting of oxalic acid, citric acid and tartaric acid, the combination of diazonium compound, reducible substance, and combustion substance being such that under the influence of light the decomposition of the diazonium compound is hastened by the presence of a compound having a lower oxide form of the metal, and such that under the influence of light the combustion substance reduces the higher oxide form of said metal to the effective lower oxide form.

18. A light sensitive material containing a decomposable diazonium compound incapable when decomposed of combining with a coupling agent to form a dyestuff, and accelerating material for said decomposition intimately associated with said diazonium compound, said accelerating material having a reducible substance in the form of a compound of a higher oxide of copper, and a combustion agent therefor, the combination of diazonium compound, reducible substance, and combustion substance being such that under the influence of light the decomposition of the diazonium compound is hastened by the presence of a compound having a lower oxide form of the metal, and such that under the influence of light the combustion substance reduces the higher oxide form of said metal to the effective lower oxide form.

19. A light sensitive material containing a decomposable diazonium compound incapable when decomposed of combining with a coupling agent to form a dyestuff, and accelerating material for said decomposition intimately associated with said diazonium compound, said accelerating material having a reducible substance in the form of a compound of a higher oxide of copper, and a combustion agent therefor derived from the group consisting of oxalic acid, citric acid and tartaric acid, the combination of diazonium compound, reducible substance, and combustion substance being such that under the influence of light the decomposition of the diazonium compound is hastened by the presence of a compound having a lower oxide form of the metal, and such that under the influence of light the combustion substance reduces the higher oxide form of said metal to the effective lower oxide form.

20. A light sensitive material containing a decomposable diazonium compound incapable when decomposed of combining with a coupling agent to form a dyestuff, and accelerating material for said decomposition intimately associated with said diazonium compound, said accelerating material having a reducible substance in the form of a compound of a higher oxide of chromium, and a combustion agent therefor, the combination of diazonium compound, reducible substance, and combustion substance being such that under the influence of light the decomposition of the diazonium compound is hastened by the presence of a compound having a lower oxide form of the metal, and such that under the influence of light the combustion substance reduces the higher oxide form of said metal to the effective lower oxide form.

21. A light sensitive material containing a decomposable diazonium compound incapable when decomposed of combining with a coupling agent to form a dyestuff, and accelerating material for said decomposition intimately associated with said diazonium compound, said accelerating material having a reducible substance in the form of a compound of a higher oxide of chromium, and a combustion agent therefor derived from the group consisting of oxalic acid, citric acid and tartaric acid, the combination of diazonium compound, reducible substance, and combustion substance being such that under the influence of light the decomposition of the diazonium compound is hastened by the presence of a compound having a lower oxide form of the metal, and such that under the influence of light the combustion substance reduces the higher oxide form of said metal to the effective lower oxide form.

22. The method of accelerating the decomposition of a diazonium compound which comprises combining with the diazonium compound light sensitive material containing a metal compound of higher oxide form of the metal and a combustion agent therefor, which material under the influence of light and in the presence of the diazonium compound is reactive to produce a compound of lower oxide form of the metal, and subjecting the mixture to the action of actinic light, whereby the lower oxide form promotes decomposition of the diazonium compound.

WALKER M. HINMAN.